United States Patent [19]

Swenson

[11] Patent Number: 5,776,399
[45] Date of Patent: Jul. 7, 1998

[54] METHOD OF MOLDING A SHAPED ARTICLE ON A HEATED AND INSULATED MOLDING TOOL

[75] Inventor: Harold W. Swenson, Dover, N.H.

[73] Assignee: Davidson Textron Inc., Dover, N.H.

[21] Appl. No.: 736,529

[22] Filed: Oct. 24, 1996

Related U.S. Application Data

[62] Division of Ser. No. 419,905, Apr. 11, 1995, Pat. No. 5,612,066.

[51] Int. Cl.⁶ .................................................. B29C 41/18
[52] U.S. Cl. ........................... 264/219; 264/301; 264/306
[58] Field of Search .......................... 264/301, 219, 264/306; 425/435, 425, DIG. 30; 428/68, 71, 313.9, 319.3; 249/114.1, 115

[56] References Cited

U.S. PATENT DOCUMENTS 5,489,410 2/1996 Baumgartner et al. .................. 264/219
5,679,432 10/1997 Holmquest et al. ....................... 428/71

FOREIGN PATENT DOCUMENTS 64-5810 1/1989 Japan ........................................ 264/302

*Primary Examiner*—Jan H. Silbaugh
*Assistant Examiner*—Edmund H. Lee
*Attorney, Agent, or Firm*—Reising, Ethington, Learman & McCulloch PLLC

[57] ABSTRACT

A method of molding a shaped article includes the steps of providing a molding tool having an exposed surface for receiving a plastic powder resin to be melted thereagainst and an insulated surface; providing an insulating panel with insulated laminated alternating layers of fiberglass and silicone rubber and an inner core filled with silicone rubber and a plurality of hollow glass beads to prevent melting of plastic powder resin on the insulated surface; applying a plastic powder resin on the exposed mold surface and melting it thereon while exposing the insulating panel to the plastic powder resin remaining in powder form thereon for reclaiming and thereafter setting said melted plastic into a plastic article by cooling the plastic article and removing it from the molding tool.

1 Claim, 2 Drawing Sheets

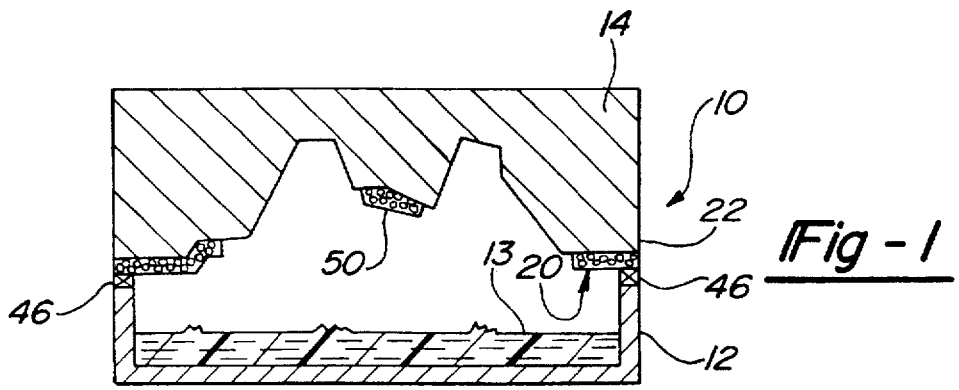
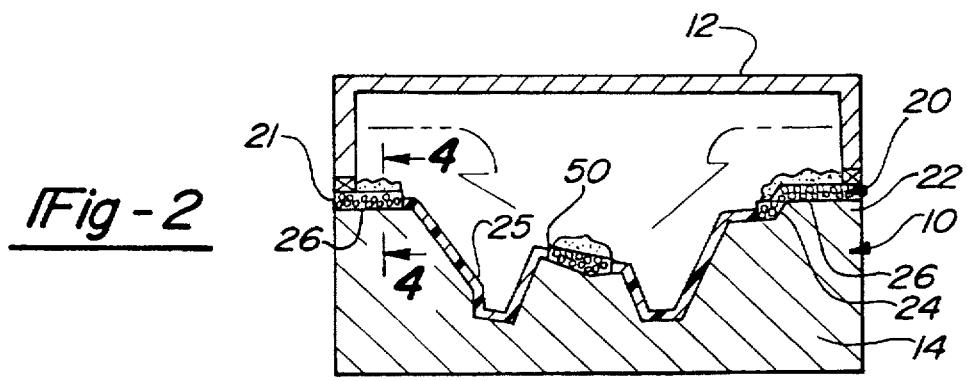
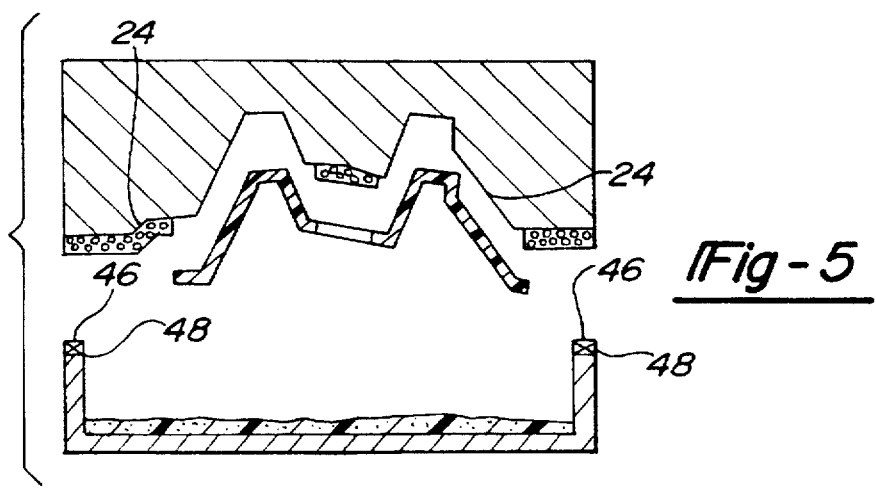

METHOD OF MOLDING A SHAPED ARTICLE ON A HEATED AND INSULATED MOLDING TOOL

This is a continuation of application Ser. No. 08/419,905, filed on Apr. 11, 1995, Pat. No. 5,612,066.

TECHNICAL FIELD

The field of this invention relates to heat insulating panels for mold tools and powder molding methods.

BACKGROUND OF THE DISCLOSURE

Several molding methods have been developed to make shaped thin plastic shells especially suitable for use in automobile trim components. One such method includes a shell made from dried thermoplastic powder material that is deposited on a heated mold tool and melts to form a skin contoured with the tool surface. The melted skin is then cured and removed from the tool surface as a finished or nearly finished part.

The molding process is accomplished with a powder box and mold box being sealed at their interface. Much attention has been directed to reducing the waste and subsequent trimming steps associated with this molding process. Waste is formed when the powder resin contacts parts of the mold where such contact is not desired. This waste then must be trimmed in a subsequent step.

Some efforts to reduce this waste material and the accompanying labor has been the development of a powder box that includes a skirt portion connected thereto having a lowered edge which contacts the mold shaped periphery. The problem with this system is that the skirt must by uniquely adapted to each unique mold shaped periphery. Furthermore, the skirt causes the minimum stroke of the powder box needed to clear the mold to be significantly lengthened thereby increasing cycle time. Furthermore, because the powder box needs to lowered below the mold, deep pits must be dug out under the molding tools to accommodate the lowering of the powder box.

Heat insulators have also been attached to powder boxes in an attempt to cool the neck portion of the powder box where the powder box is connected to the heated mold thereby preventing melting of the powder on the powder box neck. This heat insulator reduces waste build up in the neck area.

What is needed is a heat insulator that can be mounted to the mold and prevent the powder plastic resin from gelling or melting thereon to reduce waste and subsequent trimming and furthermore increases the life the sealing gasket between the mold tool and powder box.

SUMMARY OF THE DISCLOSURE

In accordance with one aspect of the invention, a method of molding a shaped article includes the steps of applying a heat insulating panel on a section of a mold surface of a molding tool and leaving an exposed section of the molding surface, preheating the exposed section of the mold surface, applying a gelling powder resin on the exposed mold surface and the heat insulating panel such that the powder resin on the exposed mold surface melts and the powder deposited on the panel remains in powder form. The powder on the heat insulating panel is then returned to the powder box to be reused. The melted plastic on the tool is then set and removed from the mold tool as a formed molded shell.

The method includes the step of closing a powder box onto the heat insulating panel before the plastic powder resin is applied, opening the powder box from the mold tool and heat insulating panel after the powder resin is applied onto the mold tool, and retaining the heat insulating panel on the mold tool throughout the closing and opening of the powder box on and off the mold tooling.

In accordance with another aspect of the invention, the heat insulating panel for a mold tool includes a lower surface for being mounted onto a section of the mold tool. The panel has an exposed upper facing surface and a thickness great enough to provide heat insulation sufficient to maintain the temperature at its upper surface lower than the melting temperature of a powder plastic resin that is melted onto the mold tool to retain any powder plastic resin on the exposed upper surface in powder form during molding with the mold tool.

Preferably, the heat insulating panel has lower, side, and upper facing walls made from laminated layers of fiberglass and silicone rubber. The inner core is filled with silicone rubber and contains a plurality of hollow glass beads. In one embodiment, the lower, side, and upper facing walls are made from a male and female member mated together to form the inner core therein. The upper and lower walls are spaced to form a panel having a thickness between approximately 0.5" and 0.75".

Preferably, the heat insulating panel has a periphery that covers the entire periphery of the mold tool. One or more island panels may be incorporated within the mold tool to form an interior opening in the molded article.

BRIEF DESCRIPTION OF THE DRAWINGS

Reference now is made to the accompanying drawings in which:

FIG. 1 is a schematic elevational view of a mold assembly illustrating one embodiment of the invention;

FIG. 2 is an schematic elevational and segmented view of the mold assembly in the closed and rotated position for molding the plastic article;

FIG. 5 is a schematic elevational view similar to FIG. 1 showing the mold and powder box in the open position with the article separated therebetween.

DETAILED DESCRIPTION OF THE PREFERRED EMBODIMENT

Referring now to FIG. 1, a mold assembly 10 includes a housing for rotatably supporting a powder box 12 and mold tool 14. The powder box 12 is closable to the mold tool 14 and the entire assembly is rotated for supplying a gelling plastic powder material such as such as a dried thermoplastic resin powder material 13 to the mold tool 14 or for emptying the mold tool 14 of the plastic powder. The mold tool 14 is preheated by suitable means for example heated air flow, hot oil piping or electric coils such that the thermoplastic resin powder material deposited thereon will melt.

Figure 3:
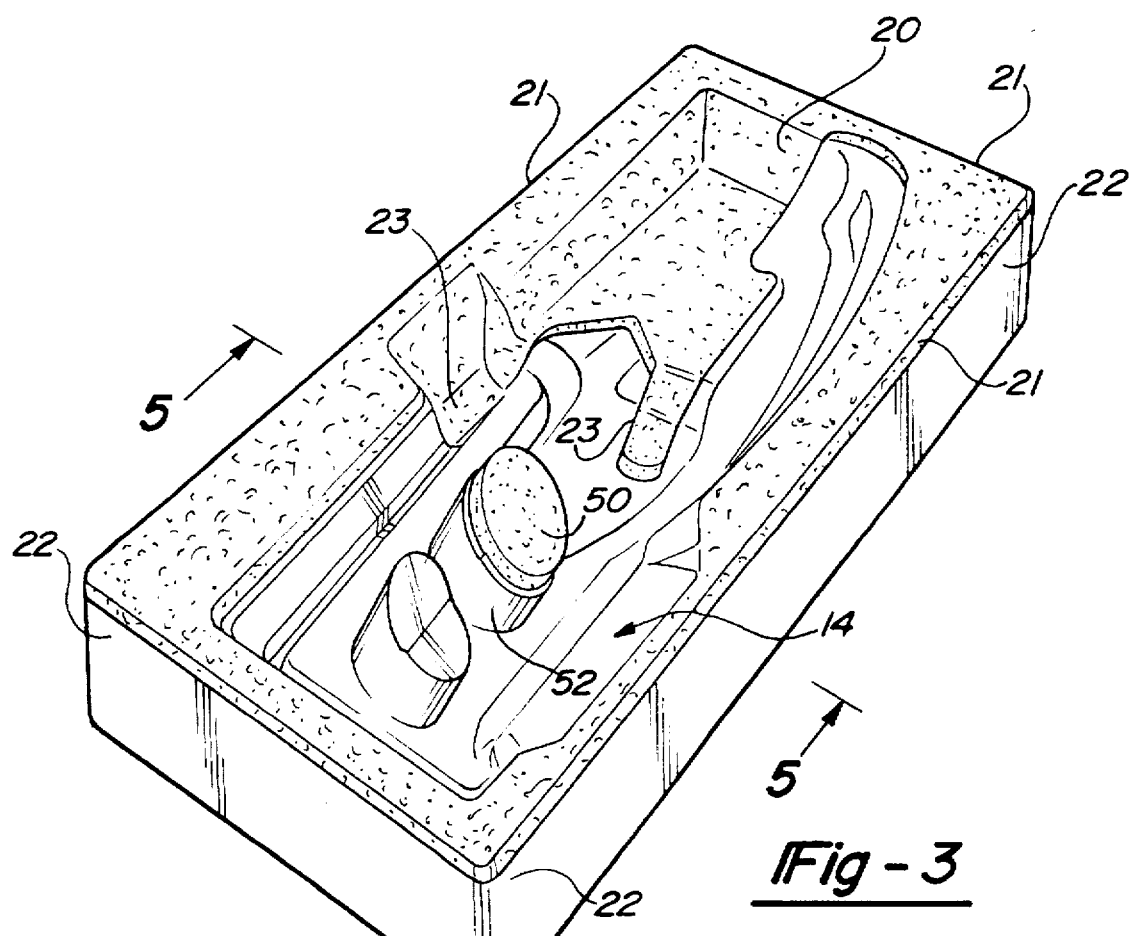
FIG. 3 is top perspective view of the mold tool shown in FIG. 2 with the powder box removed for clarity.
Figure 6:
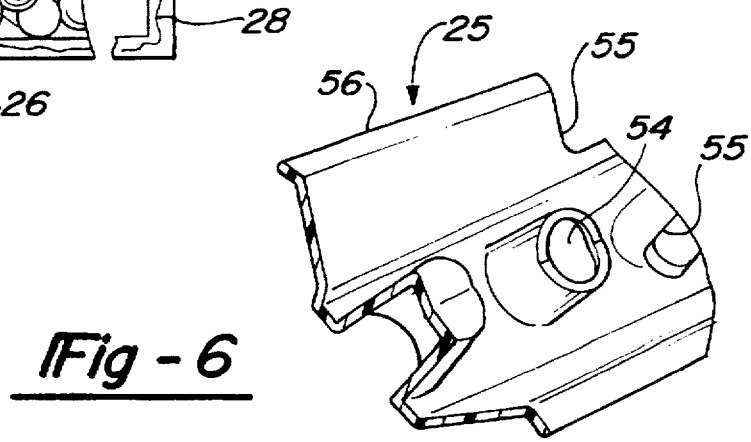
FIG. 6 is a perspective view of a finished article made in the mold tool shown in FIG. 1.

As shown clearly in FIGS. 2 and 3, a heat insulating panel 20 is secured onto the mold tool 14. The heat insulating panel 20 has a periphery 21 that aligns with the entire periphery 22 of the mold tool. At places where it is desired that the plastic does not melt on the mold tool and does not form part of the finished molded article 25, the panel 20 has an extension 23 that extends inwardly toward the center of the mold tool 14 and follow the contoured surface 24 of the mold tool. These contoured extensions 23 form ducts and notches 55 in the finished molded shell as shown in FIG. 6. An adhesive may secure the bottom wall 26 of the panel to the mold tool 14.

Figure 4:
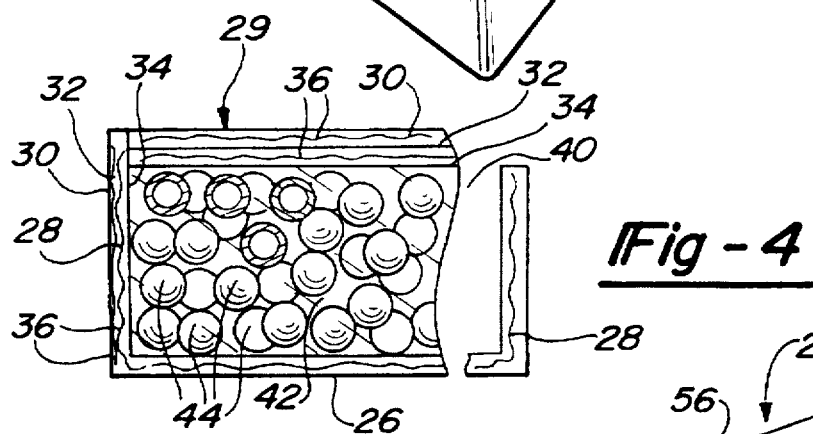
FIG. 4 is an enlarged cross-sectional view of the heat insulating panel taken along lines 4—4 shown in FIG. 2.

As shown in FIG. 4, the panel 14 has its lower wall 26 and side walls 28 form a female mold member made from a lamination of outer, middle and inner layers 30, 32, and 34 of silicone rubber such as V-270 with two layers of fiber glass mat 36 laminated therebetween. The upper facing wall 29 forms a male mold member made similarly from the mentions laminations of silicone rubber and fiberglass mat. The female and male mold members are joined to form a hollow inner core 40 that is then filled with a mix of silicone rubber 42 such as U-220 and hollow glass spheres 44. The glass spheres are approximately 3/16" diameter. The total thickness of the heat insulating panel should be at least 0.5" and maybe as thick as 0.75" for certain applications in order to sufficiently insulate heat transfer from the mold tool therethrough during the molding process. It should be understood that the reference to the lower wall and upper facing walls 26 and 29 are with reference to FIG. 2 and 3 where the mold is open facing upwardly and will be reversed in spatial relationship in FIGS. 1 and 5 where the mold is open facing downwardly.

Other types of panel construction are possible that provide the sufficient degree of heat insulation. Molded porous ceramic is also seen to be a viable construction.

The powder box 12 has a sealing gasket 46 at its open periphery 48 that can seal against the periphery 21 of the seam panel 20 when in the closed position as shown in FIGS. 1 and 2. Because the gasket 46 does not directly contact the heated mold tool 14, its durability is greatly enhanced.

An island panel 50 may be adhered to an interior section 52 of the mold tool 14 to form an interior opening 54 in the finished article. The construction of the island heat insulating panel 50 is substantially identical to panel 20.

In operation, the mold tool assembly 10 is operated by having it closed with the appropriate mold 14 and fitted panels 20 and 50. The powder box 14 has the appropriate charge of plastic powder 13 therein. The mold tool is heated to its appropriate temperature and the mold assembly 10 is rotated from the position shown in FIG. 1 to the position shown in FIG. 2 where the powder falls onto the mold tool 14 and the panels 20 and 50. The powder on the mold tool 14 melts while the powder on the heat insulating panel remains in powder form. The mold is rotated again and opened as shown in FIG. 5 where the remaining powder falls back into the powder box 12 to be reused.

The mold tool 14 can then be laterally moved from directly over the powder box 12. The mold tool 14 can then be further rotated, heated, and cooled to set the finished plastic article 25. The finished article 25 can then be removed from the mold tool 14 as shown in FIG. 6.

For opening the mold assembly 10, the powder box 12 is merely dropped from the mold tool 14 as shown in FIG. 5. There is no extra depth required due to any draw clearances of any side walls or extension panels mounted on the powder box. The panels 20 and 50 remain secured on the mold tool 14.

Once the article 25 is removed from the mold tool, the mold tool 14 needs very little if any cleaning to be ready for another cycle. There is no unwanted melted powder stuck on undesirable parts of the mold tool. The dry powder that is on the heat insulating panels 20 and 50 is recycled before it is undesirably melted. Furthermore, the article 25 needs little if any trimming along its periphery 56, notches 55, or interior aperture 54.

Variations and modifications are possible without departing from the scope and spirit of the present invention as defined by the appended claims.

The embodiments in which an exclusive property or privilege is claimed are defined as follows:

1. A method of molding a shaped plastic article characterized by the steps of:

provideing a mold tool having a mold surface with an exposed section for receiving a plastic powder resin to be melted thereagainst and a section for receiving a heat insulating panel;

providing a heat insulating panel with insulated laminated alternating layers of fiberglass and silicone rubber and an inner core filled with silicone rubber and a plurality of hollow glass beads to prevent melting of plastic powder resin;

applying the heat insulating panel on the section for receiving a heat insulating panel and leaving the exposed section of said molding surface uncovered;

preheating said exposed section of said mold surface:

applying a plastic powder resin on said exposed section of the mold surface and said heat insulating panel such that said powder resin in contact on said exposed section of the mold surface melts and said powder in contact with said heat insulating panel remains in powder form for reclaiming;

cooling said melted plastic to set said plastic on said mold tool into said shaped plastic article; and removing said shaped plastic article from said mold tool.

* * * * *